United States Patent [19]

Hoch

[11] Patent Number: 5,567,751
[45] Date of Patent: Oct. 22, 1996

[54] ALKYL-TIN PVC STABILIZERS WITH ADDED AROMATIC ETHER ALCOHOL TO PREVENT PRECIPITATION

[75] Inventor: Samuel Hoch, Brooklyn, N.Y.

[73] Assignee: Witco Corporation, Greenwich, Conn.

[21] Appl. No.: 457,813

[22] Filed: Jun. 1, 1995

[51] Int. Cl.[6] ............................................. C08K 5/58
[52] U.S. Cl. .................... 524/181; 252/400.1; 252/404; 252/407; 524/181; 524/182; 524/351; 524/352; 524/375
[58] Field of Search ........................... 524/180, 181, 524/182, 375, 351, 352; 252/400.1, 404, 407

[56] References Cited

U.S. PATENT DOCUMENTS

| | | | |
|---|---|---|---|
| 2,726,227 | 12/1955 | Leistner et al. | 524/180 |
| 2,746,946 | 5/1956 | Weinberg et al. | 524/180 |
| 2,919,259 | 12/1959 | Naylor et al. | 524/567 |
| 3,021,302 | 2/1962 | Frey et al. | 524/180 |
| 3,424,717 | 1/1969 | Gottlieb et al. | 524/181 |
| 3,442,852 | 5/1969 | Dorfelt et al. | 524/180 |
| 3,502,616 | 3/1970 | Stapter | 524/181 |
| 4,059,562 | 11/1977 | Hoch et al. | 524/180 |
| 5,032,634 | 7/1991 | Walter | 524/181 |

FOREIGN PATENT DOCUMENTS

| | | |
|---|---|---|
| 701447 | 1/1965 | Canada . |
| 45-9160 | 4/1970 | Japan . |
| 52-38556 | 3/1977 | Japan . |
| 56-843 | 1/1981 | Japan . |
| 56-61448 | 5/1981 | Japan . |
| 57-67664 | 4/1982 | Japan . |
| 64-66257 | 3/1989 | Japan . |

*Primary Examiner*—Veronica P. Hoke
*Attorney, Agent, or Firm*—Scully, Scott, Murphy & Presser

[57] ABSTRACT

Disclosed are homogeneous liquid stabilizer for polyvinyl chloride formulations and which exhibit a reduced tendency to form precipitates, comprising an aromatic ether alcohol, an alkyl or dialkyl phenol, and an admixture of alkyl tin compounds including butyltin alkyl mercaptides, butyltin hydroxyethyl mercaptides and compounds which are dibutyltin sulfides and/or monobutyltin sulfides.

23 Claims, No Drawings

ALKYL-TIN PVC STABILIZERS WITH ADDED AROMATIC ETHER ALCOHOL TO PREVENT PRECIPITATION

BACKGROUND OF THE INVENTION

The present invention relates to liquid stabilizer systems for vinyl halide resin compositions, and to resinous compositions of such products. More particularly, it relates to liquid stabilizer systems including a tin-organo sulfur compound and an additive therefor.

It is well known that vinyl halide resins undergo undesirable changes when they are exposed to heat or to light, and that these changes lead to discoloration and to deterioration of the mechanical properties of compositions containing such resins. Since elevated temperatures are required for the processing and/or formulation of compositions containing these resins, and since the resins are exposed to heat, to light, or both, when they are subsequently used, it is necessary to incorporate in the vinyl halide compositions stabilizers that will inhibit or prevent discoloration, or loss of physical integrity, when they are exposed to such conditions.

Organo tin compounds that contain sulfur have long been recognized as highly effective heat stabilizers for vinyl halide resin compositions. Examples include organo tin ethanol mercaptides such as those disclosed in U.S. Pat. No. 4,059,562; organotin aliphatic mercaptides as disclosed in U.S. Pat. No. 2,726,227; dialkyltin sulfides as disclosed in U.S. Pat. No. 2,746,946; monoalkyltin sulfides as disclosed in U.S. Pat. No. 3,021,302; reaction products of organotin trihalides with sodium alkylmercaptide and sodium sulfide, as disclosed in U.S. Pat. No. 3,442,852; and monomeric tetra-functional organo tin mono- or di-alkyl di- or tri- (alkyl thioglycolate) or (mercapto alkyl carboxylate) compounds such as disclosed in U.S. Pat. No. 5,032,634.

A thorough historical review of organotin and organotin-sulfur compounds in stabilizing polyvinyl chloride compositions appears in the "Plastics Additives and Modifiers Handbook" (J. Edenbaum, Van Nostrand Reinhold, 1992, at pp. 309–326, Chapter 19: Dworkin, "Polyvinyl chloride processing stabilizers: tin and its derivatives".

Combinations of alkyl tin sulfides and alkyl mercaptides are useful liquid stabilizers for vinyl halide resins, but have long been known to exhibit a tendency to form precipitates on formation, or on standing. The precipitates generally have a higher tin content than the liquid product, but are considerably less effective as stabilizers. Thus, the formation of the precipitates represents an undesirable economic loss, in the stabilization efficiency which is lost, in the cost of the product which is lost to the precipitate, as well as in the input of material and energy necessary to attempt to redissolve or otherwise handle the precipitates.

In particular, as pointed out in U.S. Pat. No. 4,059,562, organotin ethanol mercaptides are subject to cloudiness and decomposition in storage. According to that patent, avoiding the cloudiness and decomposition requires formulating the mercaptides with 10 to 40% of a liquid alcohol component that comprises a glycol and an alkyl acid phosphate.

There thus remains a need to formulate liquid stabilizers for vinyl halide compositions, which do not exhibit a tendency to form precipitates and yet which otherwise can be formulated effectively into vinyl halide resin compositions.

BRIEF SUMMARY OF THE INVENTION

One aspect of the present invention is a homogeneous liquid stabilizer composition for poly(vinyl halide) compositions which exhibits a reduced tendency to form precipitate on standing, comprising (a) an aromatic ether alcohol of formula (1)

$$Ar-O-(CH_2CH(X)O)_nH \qquad (1)$$

wherein Ar is aryl containing 6 to 10 carbon atoms;
X independently in each occurrence is —H or —CH$_3$; and
n is 1 to 5; and (b) an alkyl phenol of formula (2)

$$A_k-C_6H_{5-k}OH \qquad (2)$$

wherein k is 1 or 2 and A is straight or branched alkyl containing 1 to 12 carbon atoms provided that the total number of carbon atoms in said 1 or 2 alkyl groups A is 6 to 24; and (c) an admixture of alkyl tin compounds including one or more butyltin alkyl mercaptides corresponding to formula (3)

$$(R^1)_a Sn(-SR^2)_{4-a} \qquad (3)$$

one or more butyltin hydroxyethyl mercaptides corresponding to formula (4)

$$(R^1)_a Sn(-SCH_2CH_2OH)_{4-a} \qquad (4)$$

and one or more compounds selected from the group consisting of dibutyl tin sulfides corresponding to formula (5a) and monobutyl tin sulfides corresponding to formula (5b)

$$(R^1)_2 SnS \text{(5a)} \quad (R^1Sn)_2S_3 \qquad (5b)$$

wherein R$^1$ is a butyl group; a is 1 to 2; and R$^2$ independently at each occurrence is straight or branched alkyl or alkenyl having 8 to 16 carbon atoms.

The foregoing composition can optionally be admixed with one or more methyltin compounds selected from the group consisting of methyltin mercaptides corresponding to formula (3) wherein R$^1$ is methyl, methyltin hydroxyethyl mercaptides corresponding to formula (4) wherein R$^1$ is methyl, dimethyl tin sulfides corresponding to formula (5a) wherein R$^1$ is methyl, and monomethyl tin sulfides corresponding to formula (5b) wherein R$^1$ is methyl. When any such methyltin compound is present, the total amount of all such methyltin compounds present, as a ratio (on an equivalents basis) to the total amount of all compounds present corresponding to formulas (3), (4), (5a) and (5b) wherein R$^1$ is butyl, is up to 1:1, generally 1:99 to 1:1.

The components (a), (b) and (c) are present in such amounts relative to each other that the composition containing components (a), (b), and (c) is a homogeneous liquid which does not exhibit the formation of haze or precipitates on formation and is stable against formation of precipitates on standing, even prolonged standing.

Another aspect of the present invention is vinyl halide resin compositions containing such a stabilizer composition in an amount thereof effective to impart to the vinyl halide resin increased stability against heat-mediated degradation of the polymer composition.

Another aspect of the present invention is the method of providing stability against precipitate formation of a liquid stabilizer composition which comprises one or more compounds of the foregoing group (c), comprising admixing into said composition one or more compounds of the foregoing formula (1) and one or more compounds of the foregoing formula (2) in amounts thereof effective to provide stability against precipitate formation of said admixture.

DETAILED DESCRIPTION OF THE INVENTION

The present invention surprisingly affords numerous advantages, heretofore unavailable, to stabilizer compositions containing one or more compounds of formula (3). Preferably, the stabilizer compositions of the present invention comprise an admixture of at least one compound represented by formula (3), at least one compound represented by formula (4), and at least one compound represented by formula (5a) or by formula (5b).

Referring again to formula (3), the radical $R^2$ is an alkyl group, or an alkenyl group containing up to 3 carbon-carbon double bonds, and overall contains 8 to 16 carbon atoms. $R^2$ can be straight-chained or branched, and is preferably straight. The preferred embodiments of $R^2$ are alkyl containing 10 to 14 carbon atoms, and most preferably $R^2$ is an alkyl group which contains 12 carbon atoms, i.e. lauryl.

The radical $R^1$ in each of formulas (3), (4), (5a) and (5b) denotes a butyl radical containing 4 carbon atoms, i.e. n-butyl, isobutyl, sec-butyl or tert-butyl. Preferred embodiments of the present invention include those wherein $R^1$ is n-butyl and those wherein compounds of the formulas (3), (4), (5a) and/or (5b) in which $R^1$ is methyl are present together with compounds of any of said formulas wherein $R^1$ is n-butyl.

Again referring to formula (3) there are 2 or 3 groups of the formula $R^2$—S—, and 1 or 2 groups of the formula $R^1$, provided that the total number of both of said groups present is 4.

In the composition and method of the present invention, there are present hydroxyethyl mercaptides corresponding to formula (4) and sulfides corresponding to formulas (5a) and/or (5b), in which $R^1$ and a are as defined above.

It has now been discovered that liquid stabilizer compositions containing one or more alkylmercaptide compounds of formula (3), one or more hydroxyethyl mercaptide compounds of formula (4), and one or more sulfides of either or both of formulas (5a) and (5b), are surprisingly and effectively rendered resistant to formation of precipitate by the presence of effective amounts of one or more compounds of each of formulas (1) and (2) as described herein.

In the compounds of the formula (1)

$$\text{Ar—O—(CH}_2\text{CH(X)O)}_n\text{H} \qquad (1)$$

the group Ar can be a monocyclic or bicyclic aryl group containing 6 to 10 carbon atoms. Preferably, Ar is phenyl. This compound of formula (1) contains 1 to 5 repeating alkoxy units. As can be seen, each occurrence of the substituent X can be hydrogen or methyl, although it is preferred that each occurrence of the substituent X in a given compound is the same. The compound of the formula (1) should be water-insoluble, by which is meant that it exhibits a solubility of less than 3 grams per 100 milliliters of water.

Compounds of formula (1) can be synthesized in a straightforward manner by reaction of the corresponding aryloxy precursor, e.g. phenol, and alkylene oxide such as ethylene oxide or propylene oxide whereby the aryl group is attached to one end thereof. Compounds of formula (1) which exhibit satisfactory performance in the compositions of the present invention are also commercially available. For instance, ethylene glycol phenyl ether (having the formula $C_6H_5OC_2H_4OH$) and propylene glycol phenyl ether (also termed 1-phenoxy-2-propanol, having the formula $C_6H_5OC_3H_6OH$) are commercially available as, respectively, "Dowanol EPh" and "Dowanol PPh" from Dow Chemical Company.

Compounds of formula (2), known as alkylphenols, are generally commercially available and can readily be synthesized by straightforward synthetic techniques. There can be one or two alkyl substituents A in formula (2), and when two such substituents are present they can be the same or different. Each substituent A is straight or branched alkyl containing 1 to 12 carbon atoms, provided that the total number of carbon atoms in the one or two A groups present is 6 to 24. Each A contains preferably 6 to 12 carbon atoms. The alkyl substituents A and the —OH group can be ortho, meta or para to each other. Examples of suitable compounds of formula (2) include hexylphenol, heptylphenol, sec-octylphenol, tert-octylphenol, diisopropylphenol, nonylphenol, dinonylphenol, and didodecylphenol.

Satisfactory ratios of the amounts of aromatic ether alcohol(s) of formula (1) and the alkyl phenol(s) of formula (2) to each other and to the one or more compounds of formulas (3), (4), (5a) and (5b) present in the composition, can be ascertained for any particular formulations being employed, for instance by formulating a given composition and assessing its tendency to form precipitate upon formulation and upon standing for a given length of time at a specified temperature.

The relative amounts of the compounds of formula (3), of formula (4), and of formulas (5a) and/or (5b) present in the composition are conveniently expressed as equivalents. The ratio in equivalents of the amount of all alkyl mercaptide of formula (3) present, to the amount of all hydroxyethyl mercaptide of formula (4) present, is preferably 60:40 to 80:20. The ratio in equivalents of the amount of all mercaptide together, of formulas (3) and (4), present to the amount present of sulfide of formulas (5a) and (5b), is preferably 55:45 to 75:25. It should be understood that the number of equivalents present of a given compound is proportional to the number of moles thereof present, through the equation (no. of equivalents)=(no. of moles)×(valence). For the compounds referred to in the foregoing ratios and precursors thereof, the amounts thereof and the number of equivalents thereof are related as follows:

| Compound | No. of equivalents per one mole |
| --- | --- |
| Alkyl mercaptan ($R^1$SH) | 1 |
| 2-Mercaptoethanol (HOCH$_2$CH$_2$SH) | 1 |
| Sodium sulfide (Na$_2$S) | 2 |
| Dialkyltin dialkyl mercaptide (formula (3), a = 2) | 2 |
| Monoalkyltin trialkyl mercaptide (formula (3), a = 1) | 3 |
| Dialkyltin bis(hydroxyethyl mercaptide) (formula (4), a = 2) | 2 |
| Monalkyltin tris(hydroxyethyl mercaptide) (formula (4), a = 1) | 3 |
| Dialkyltin sulfide (formula (5a)) | 2 |
| Monoalkyltin sulfide (formula (5b)) | 6 |

The ratio of the amount of the one or more compounds of formula (1) present in the composition of the present invention to the total amount of all compounds of formulas (3), (4), (5a) and (5b) is preferably 3 to 7 wt. %.

The ratio of the amount of the one or more compounds of formula (2) present in the composition of the present invention to the total amount of all compounds of formulas (3), (4), (5a) and (5b) is preferably 4 to 10 wt. %.

Without intending to be bound by any particular explanation of the operation of the invention, the invention has been observed to exhibit behavior consistent with the proposition that since the aromatic ether alcohol is essentially water insoluble, this insolubility assists in retaining the tin compounds of formula (3) and sulfides thereof in the stabilizer product. This behavior retains the full stabilization capability of the tin compounds and simultaneously avoids contamination of waste water streams generated during the synthesis of the compounds. In addition, the aromatic ether alcohol appears to contribute uniformity to the organic phase that is formed, while solubilizing the various species of the stabilizer composition to form a homogeneous liquid product. The aromatic ether alcohol also reduces the water content in the organic phase, thus effectively reducing the time and the severity of the conditions (e.g. temperature) necessary to dry (e.g. remove water from) the product.

In the present invention, and particularly in those embodiments comprising tin compounds substituted with both methyl and butyl groups, it has also been determined that the stability against precipitate formation is further enhanced if the liquid composition also contains an effective amount of a mercaptoalkyl ester of one or more linear fatty acids containing 16 to 20 carbon atoms and 0–3 carbon-carbon double bonds. The mercaptoalkyl substituent can be straight or branched and can contain 1 to 4 carbon atoms; the preferred mercaptoalkyl substituent is 2-mercaptoethyl. Contemplated for purposes of this invention are mixtures of such esters, including especially mixtures of a given ester (e.g. the 2-mercaptoethyl esters) of a mixture of fatty acids conforming to the foregoing definition. One preferred embodiment of this aspect of the invention is "2-mercapto tallate", that is, the 2-mercaptoethyl esters of tall oil fatty acids. Tall oil fatty acids are a recognized commercial product comprising a mixture of saturated and unsaturated fatty acids, predominately $C_{16}$–$C_{20}$ in length. Typical tall oil fatty acids include mixtures comprising generally about 0.1 wt. % palmitic acid, 0.3 wt. % palmitoleic acid, 2.1 wt. % stearic acid, 48.5 wt. % oleic acid, 43.1 wt. % linoleic acid (various isomers), 3.5 wt. % pinolenic acid, and 1.1 wt. % eicosenoic acid, it being recognized that each of the values are expressed as ±10%.

Typically, the mercaptoalkyl fatty acid ester component is about 3 wt. % to about 10 wt. % of the liquid stabilizer composition, and more preferably about 5 wt. % to about 7 wt. % thereof.

Compounds of formulas (3), (4), (5a) and (5b) and admixtures thereof can be prepared in straightforward manner by reacting precursors as described herein. The precursors are readily available commercially and can themselves be synthesized readily.

In general, compounds of formula (3) and (4) can be prepared by reacting monoalkyl tin trihalide, dialkyl tin dihalide, or a mixture thereof (wherein the halide is preferably chloride), with one or more alkyl mercaptans of the formula $R^2SH$, with 2-mercaptoethanol or (preferably) with both of one or more of said alkyl mercaptans and 2-mercaptoethanol, wherein $R^2$ is as defined herein. The reaction is preferably carried out in an aqueous alkaline solution containing, for example, ammonium hydroxide, potassium hydroxide or sodium hydroxide. The product is recovered as a hydrophobic liquid phase separating from the aqueous phase, for instance in a separatory funnel, followed by stripping and filtering undesired side products.

Similarly, compositions including sulfides of one or more compounds of formulas (5a) and/or (5b), including monoalkyl tin sulfides, dialkyl tin sulfides, or both, can be made by carrying out the aforementioned reaction in aqueous alkaline solution and then adding a solution of a sulfide such as sodium sulfide in water, thereby to convert remaining trihalides and/or dihalides to sulfide. The desired product is recovered as a hydrophobic liquid phase separating from an aqueous brine phase in a decanting vessel such as a separatory funnel, and stripping and filtering undesirable side products.

The compound or compounds of formulas (1) and (2) present according to the present invention are preferably added to the reaction mixture during the aforementioned series of synthesis steps, although it is preferred to add the ether of formula (1) prior to addition of the sulfide reagent and to add the alkylphenol after addition of the sulfide reagent. Addition of the compounds of formulas (1) and (2) can also be effected following recovery of the composition as separated from the aqueous phase, but this is less preferred as the tin-based stabilizer would still be vulnerable to precipitate formation during the period before the aromatic ether and the alkyl phenol are added.

It will of course be recognized that the reagents described herein should be added in the appropriate amounts effective to form, following their reaction, compositions which exhibit the desired conformity to the empirical formulas, and which exhibit the ranges of amounts and ratios, described herein. Identification of those amounts of reagents is a straightforward matter for those familiar with this field of technology.

Synthesis of the liquid stabilizer composition in accordance with the present invention exhibits rapid phase separation, thereby facilitating synthesis and minimizing the need to remove entrained water. Thus, the organic phase formed in the synthesis generally contains surprisingly reduced amounts of water on the order of 1 to 10%, and often 1 to 5%.

The liquid stabilizer compositions of the present invention are preferably used to advantage in combination with vinyl halide resins, preferably polyvinyl cloride resins. The term "polyvinyl chloride" as used herein is inclusive of any polymer formed at least in part of the recurring group $(-CHCl-CX_2-)_p$ and having a chlorine content in excess of 40%. In this formula, each of the X groups can be either hydrogen or chlorine, and p is the number of units in each polymer chain. In polyvinyl chloride homopolymers, each of the X groups is hydrogen. Thus, the terms "PVC" and "polyvinyl chloride" include not only polyvinyl chloride homopolymers but also after-chlorinated polyvinyl chlorides, as well as copolymers of vinyl chloride in a major proportion with other copolymerizable monomers in moderate proportion such as copolymers of vinyl chloride and vinyl acetate, copolymers of vinyl chloride with maleic or fumaric acids or esters, and copolymers of vinyl chloride with styrene. The stabilizer compositions are effective also with mixtures of polyvinyl chloride in major proportion with a minor proportion of other synthetic resins such as chlorinated polyethylene or copolymers of acrylonitrile, butylene and styrene.

Stabilizer compositions of the present invention can be used with plasticized polyvinyl chloride resin compositions of conventional formulation. Conventional plasticizers well known to those skilled in the art can be employed such as, for example, dioctyl phthalate, octyl diphenylphospate, and epoxidized soybean oil. Particularly useful plasticizers are the epoxidized esters having from 20 to 150 carbon atoms.

The stabilizer compositions of the present invention are used in small but effective amounts to impart heat stability, that is, enhanced resistance to heat-mediated deterioration of the PVC or other polyvinyl chloride resin. That is, "heat-mediated deterioration" includes deterioration which is due to exposure to excessive heat, as well as deterioration which is initiated or accelerated by exposure to heat. Effective heat stability is afforded generally by adding about 0.5 to about 5 phr (parts by weight per hundred parts by weight of resin) of the stabilizer composition. Preferred amounts of the stabilizer are generally in the range of about 1 to 4 phr. The liquid stabilizer can be compounded into the resin formulation in accordance with conventional compounding techniques abundantly familiar to one of ordinary skill in this art.

The stabilized polyvinyl chloride resin composition comprising these components can also contain conventional additional additives such as antioxidants, lubricity agents, flame retardants, fillers, pigments, and the like, in relative amounts effective to fulfill the desired functions of each such ingredient. These ingredients can be added, if desired, prior to, during, or subsequent to the step in which the heat stabilizer composition of the present invention is compounded into the polyvinyl chloride composition.

The homogeneous liquid stabilizer compositions prepared in accordance with the teachings of the present invention have been found to exhibit little or no precipitation upon standing at ambient temperature for a year or longer.

In addition, polyvinyl chloride formulations prepared with the liquid stabilizer compositions of the present invention have been found to exhibit not only notable heat stability, but also superior whiteness, color hold, and long-term dynamic stability.

The invention will be described further in the following examples, which are intended for illustration and should not be deemed limiting of the scope of the present invention.

EXAMPLE 1

Into a 2-liter beaker were charged 385.0 g of an aqueous solution of monobutyl tin trichloride, the solution containing 19.6 wt. % Cl (2.127 moles Cl), and 100.0 g of water. Then, 201.5 g of 97 wt. % lauryl mercaptan (0.9678 mole active) and 32.5 g (0.4148 mole) of 2-mercapto ethanol were added to the beaker at 60°–65° C. followed by 276.5 grams of a 20 wt. % sodium hydroxide solution (1.3825 moles NaOH). This mixture was agitated for 30 minutes, following which 18.0 grams of "Dowanol PPh" propylene glycol phenyl ether was added, followed by a solution of 48.4 grams (0.3722 mole) of $Na_2S$ (60%) in 200 grams of water. The final aliquot was added carefully to a final pH of 7.0. Then 24.0 grams of nonyl phenol was added, and the mixture was agitated for about 1 hour at 60°–65° C. The mixture was transferred to a separatory funnel and allowed to settle for 1–2 hours. The liquid stabilizer formed as a liquid product above the aqueous phase in the separatory funnel. It was recovered from the funnel and was found to weigh 438.4 grams. This product was transferred to a 3-neck flask and stripped (of water) at 20 mm pressure and 105° C. The weight of the product remaining after the stripping step was 403.0 grams. This corresponds to a moisture content of 8.9% in the product prior to stripping. The stripped product was filtered through a celluosic filter medium and the final product weighed 379.0 grams.

The tin and sulfur contents of this product, based on the reactants, were 20.2% tin, 11.0% mercaptan sulfur, and 2.9% sulfide sulfur (i.e. on an equivalents basis, a ratio of SH:S of about (1.90:1).

EXAMPLE 2

The procedure employed in Example 1 was carried out with 237.5 grams of a mixture of monobutyltin trichloride and dibutyl tin dichloride comprising 31.75 wt. % Cl (2.127 moles Cl) and 200.0 grams of water, followed by 201.5 grams of lauryl mercaptan (97% active), 32.5 grams of 2-mercapto ethanol, 276.5 grams of sodium hydroxide (20% solution), 18.0 grams of propylene glycol phenyl ether, a solution of 48.4 grams of $Na_2S$ in 200.0 grams of water, and then 24.0 grams of nonyl phenol.

The weight of the recovered organic product, which was in the upper layer, was 455.4 grams; the weight following the stripping of water was 438.2 grams. This corresponded to a moisture content of 3.8% in the product before stripping. The final product obtained after filtration weighed 420.0 grams.

The tin and sulfur contents of this product, based on the amounts of the reactants, were 21.5% tin, 10.3% mercaptan sulfur, and 2.7% sulfide sulfur (i.e. on an equivalents basis, a ratio of SH:S of about 1.9:1).

EXAMPLE 3

The procedure employed in Example 1 was carried out with 118.7 grams of a mixture of monobutyl tin trichloride and dibutyl tin dichloride comprising 31.75 wt. % Cl (1.0635 moles Cl), 91.7 grams of a mixture of a 75:25 (weight) mixture of monomethyl tin trichloride: dimethyl tin dichloride comprising 41.1 wt. % Cl (1.0635 moles Cl) and 200.0 grams of water, followed by 201.5 grams of lauryl mercaptan (97%), 32.5 grams of 2-mercapto ethanol, 276.5 grams of a 20 wt. % sodium hydroxide solution, 18.0 grams of propylene glycol phenyl ether, then a solution of 48.4 grams of $Na_2S$ in 200 grams of water, followed by 24.0 grams of nonyl phenol and 25.0 of 2-mercaptoethyl tallate (9.2 wt %-SH).

The weight of the recovered organic product, which was in the upper layer, was 449.5 grams; the weight following the stripping of water was 429.0 grams. This corresponded to a moisture content of 4.8 wt. % in the product before stripping. The final product obtained after filtration weighed 411.0 grams, The tin and sulfur contents of this product based on the amounts of the reactants, were 21.5% tin, 10.9% mercaptan sulfur, and 2.7% sulfide sulfur (i.e. on an equivalents basis, a ratio of SH:S of about 2:1).

By comparison, omission of the nonylphenol and phenoxypropanol additives from the foregoing preparative procedures results in products that are immediately seen to be unsatisfactory because of the formation of haze, or appreciable formation of solids, or both (representing increased amounts of product values removed upon subsequent filtration and thereby lost).

EXAMPLES 4–5

PVC formulations containing various stabilizers were made in accordance with the following compositions, and were tested for color stability in a "dynamic Brabender" procedure wherein the PVC formulation was heated in a continuous mixer and torque rheometer and periodically sampled to monitor color changes and melt viscosity.

| Siding Formulation | |
|---|---|
| PVC homopolymer ("Oxy 225", Oxy Chemical Corp.) | 100.0 (all in parts by wt.) |
| Acrylic copolymer processing aids | |
| ("K-125", Rohm & Haas) | 2.0 |
| ("K-175", Rohm & Haas) | 1.0 |

| | |
|---|---|
| Acrylic polymer blend, impact modifier ("KM-323B", Rohm & Haas) | 7.0 |
| Calcium stearate | 1.0 |
| Paraffin wax (m.p. approx. 165° F.) | 1.0 |
| Titanium dioxide | 10.0 |
| Stabilizer | 1.0 |

| Clear PVC Formulation | |
|---|---|
| PVC homopolymer ("Oxy 225", Oxy Chemical Corp.) | 100.0 |
| Diisooctyl phthalate | 5.0 |
| Acrylic copolymer processing aid ("K-120N", Rohm & Haas) | 1.5 |
| Oxidized polyethylene ("AC 629A", Allied-Signal) | 0.2 |
| Stabilizer | 1.5 |

Samples of the siding and clear formulations containing, in turn, each of the stabilizers described in Examples 1, 2 and 3 were found to be equivalent or superior to formulations containing different stabilizers (not containing the aryl ether alcohols) in whiteness, color hold and long-term dynamic stability. Thus, it can be seen that the compositions of the present invention are effective stabilizers in addition to their virtues in exhibiting a reduced tendency to form precipitate on standing.

What is claimed is:

1. A homogeneous liquid stabilizer composition for vinyl halide compositions, which exhibits a reduced tendency to form precipitate, comprising (a) an aromatic ether alcohol of the formula (1)

$$Ar-O-(CH_2CH(X)O)_nH \quad (1)$$

wherein Ar is aryl containing 6 to 10 carbon atoms,
   X independently at each occurrence is —H or —$CH_3$; and
   n is 1 to 5; provided that when X is —H, then n is 1;

(b) an alkyl phenol of the formula (2)

$$A_k-C_6H_{5-k}OH \quad (2)$$

wherein k is 1 or 2 and A is straight or branched alkyl containing 1 to 12 carbon atoms; provided that the total number of carbon atoms in said 1 or 2 alkyl groups A is 6 to 24 carbon atoms; and (c) an admixture of alkyl tin compounds including (c) (i) one or more butyltin alkyl mercaptides corresponding to formula (3)

$$(R^1)_aSn(-SR^2)_{4-a} \quad (3)$$

and (c) (ii) one or more butyltin hydroxyethyl mercaptides corresponding to formula (4)

$$(R^1)_aSn(-SCH_2CH_2OH)_{4-a} \quad (4)$$

and (c) (iii) one or more compounds selected from the group consisting of dibutyltin sulfides corresponding to formula (5a) and monobutyltin sulfides corresponding to formula (5b)

$$(R^1-)_2SnS \quad (5a)$$

$$(R^1Sn)_2S_3 \quad (5b)$$

wherein $R^1$ is a butyl group; a is 1 to 2; and $R^2$ independently at each occurrence is straight or branched alkyl or alkenyl having 8 to 16 carbon atoms; which admixture is optionally admixed with one or more methyltin compounds selected from the group consisting of methyltin alkylmercaptides corresponding to formula (3) wherein $R^1$ is methyl, methyltin hydroxyethyl mercaptides corresponding to formula (4) wherein $R^1$ is methyl, dimethyl tin sulfides corresponding to formula (5a) wherein $R^1$ is methyl, and monomethyltin sulfides corresponding to formula (5b) wherein $R^1$ is methyl.

2. A composition according to claim 1 wherein said components (a) and (b) are present in amounts, relative to the amount of said component (c), effective to increase the storage stability of said composition.

3. A composition according to claim 1 wherein the quantity of component (a) is 3 to 7% by weight of component (c) and the quantity of component (b) is 4 to 10% by weight of component (c).

4. A composition according to claim 1 wherein Ar is phenyl.

5. A composition according to claim 4 wherein n is 1 and X is —$CH_3$.

6. A composition according to claim 1 further comprising one or more mercapto —$C_1$-$C_4$— alkyl esters of fatty acid containing 16 to 20 carbon atoms.

7. A composition according to claim 6 wherein said one or more mercaptoalkyl esters comprise one or more mercaptoethyl esters.

8. A composition according to claim 1 which comprises one or more compounds selected from the group consisting of compounds of formulas (3), (4), (5a) and (5b) wherein $R^1$ is methyl.

9. A composition according to claim 8 wherein the ratio of the amount present of said one or more compounds wherein $R^1$ is methyl, to the amount present of said one or more compounds wherein $R^1$ is n-butyl, on an equivalents basis, is up to 1:1.

10. A polymeric composition of matter comprising a vinyl halide polymer and a stabilizer composition according to claim 1 in an amount thereof effective to impart to the polymeric composition increased stability against heat-mediated degradation of the polymer.

11. A composition according to claim 10 wherein the quantity of component (a) is 3 to 7% by weight of component (c) and the quantity of component (b) is 4 to 10% by weight of component (c).

12. A composition of matter according to claim 10 wherein the polymer is a homopolymer of vinyl chloride.

13. A composition of matter according to claim 10 wherein the polymer is a copolymer of vinyl chloride.

14. A composition of matter according to claim 10 wherein Ar is phenyl.

15. A composition of matter according to claim 10 wherein n is 1 and X is —$CH_3$.

16. A polymeric composition of matter comprising a vinyl halide polymer and a stabilizer composition according to claim 8 in an amount thereof effective to impart to the polymeric composition increased stability against heat-mediated degradation of the polymer.

17. A method for reducing the tendency of a liquid stabilizer composition for vinyl halide compositions to form precipitate, wherein said liquid stabilizer composition comprises a) an admixture of alkyltin compounds including (a) (i) one or more butyltin alkylmercaptides of formula (3)

$$(R^1)_aSn(-SR^2)_{4-a} \quad (3)$$

and (a) (ii) one or more butyltin hydroxyethylmercaptides of formula (4)

$$(R^1)_aSn(-SCH_2CH_2OH)_{4-a} \quad (4)$$

and (a) (iii) one or more compounds selected from the group consisting of dibutyltin sulfides of formula (5a) and monobutyltin sulfides of formula (5b)

$$(R^1)_aSnS \quad (5a) \quad (R^1Sn)_2S_3 \quad (5b)$$

wherein $R^1$ is butyl, a is 1 to 2, and $R^2$ independently at each occurrence is straight or branched alkyl or alkenyl containing 6 to 18 carbon atoms; which admixture is optionally admixed with one or more compounds selected from the group consisting of methyltin alkylmercaptides corresponding to formula (3) wherein $R^1$ is methyl, methyltin hydroxyethyl mercaptides corresponding to formula (4) wherein $R^1$ is methyl, dimethyltin sulfides corresponding to formula (5a) wherein $R^1$ is methyl, and monomethyl tin sulfides corresponding to formula (5b) wherein $R^1$ is methyl.

wherein the method comprises adding to said liquid stabilizer composition, during or after synthesis thereof, one or more compounds of formula (1)

$$ArO—(CH_2CH(X)O)_nH \quad (1)$$

wherein Ar is aryl containing 6 to 10 carbon atoms, X independently at each occurrence is —H or —$CH_3$, and n is 1 to 5, provided that when X is —H, n is 1, and one or more compounds of formula (2)

$$A_k—C_6H_{5-k}OH \quad (2)$$

wherein k is 1 or 2, and A is straight or branched alkyl containing 1 to 12 carbon atoms, provided that the total number of carbon atoms in said 1 or 2 alkyl groups A is 6 to 24 carbon atoms, in an amount of said compounds of formulas (1) and (2) effective to reduce the tendency of said composition to form precipitate on standing.

18. A method according to claim 17 wherein Ar is phenyl.

19. A method according to claim 18 wherein n is 1 and X is —$CH_3$.

20. A method according to claim 19 comprising adding sufficient amounts of said compounds of formulas (1) and (2) such that following said addition, the quantity of said component (a) is 3 to 7% by weight of the quantity of component (c) and the quantity of component (b) is 4 to 10% by weight of component (c).

21. A method according to claim 17 further comprising adding to said liquid stabilizer composition one or more mercapto —$C_1$–$C_4$-alkyl esters of fatty acid containing 20 to 24 carbon atoms, in an amount thereof corresponding to a weight percentage of 3 to 10% with respect to the amount of component (c).

22. A method according to claim 17 wherein said liquid stabilizer composition further comprises one or more compounds selected from the group consisting of compounds of formulas (3), (4), (5a), and (5b) wherein $R^1$ is methyl.

23. A method according to claim 22 wherein the ratio of the amount of said one or more compounds wherein $R^1$ is methyl, to the amount of said one or more compounds wherein $R^1$ is n-butyl, on an equivalents basis, is up to 1:1.

* * * * *

UNITED STATES PATENT AND TRADEMARK OFFICE
CERTIFICATE OF CORRECTION

PATENT NO. : 5,567,751
DATED : October 22, 1996
INVENTOR(S) : Samuel Hoch

It is certified that error appears in the above-indentified patent and that said Letters Patent is hereby corrected as shown below:

Column 9, line 49, Claim 1: " $(R^1)_4$ " should read -- $(R^1)_a$ --

Column 11, line 5, Claim 17: " $(R^1)_a SnS$ " should read -- $(R^1)_2 SnS$ --

Signed and Sealed this

Sixth Day of May, 1997

Attest:

BRUCE LEHMAN

Attesting Officer

Commissioner of Patents and Trademarks